(12) United States Patent
Ziegler et al.

(10) Patent No.: US 6,944,001 B2
(45) Date of Patent: *Sep. 13, 2005

(54) CIRCUIT INTERRUPTING SYSTEM WITH INDEPENDENT TRIP AND RESET LOCKOUT

(75) Inventors: William R. Ziegler, East Northport, NY (US); Nicholas L. DiSalvo, Levittown, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/702,571

(22) Filed: Nov. 6, 2003

(65) Prior Publication Data

US 2004/0095696 A1 May 20, 2004

Related U.S. Application Data

(63) Continuation of application No. 09/939,370, filed on Aug. 24, 2001, now Pat. No. 6,646,838, which is a continuation-in-part of application No. 09/369,759, filed on Aug. 6, 1999, now Pat. No. 6,282,070, which is a continuation-in-part of application No. 09/138,955, filed on Aug. 24, 1998, now Pat. No. 6,040,967.

(51) Int. Cl.[7] ................................................ H02H 3/00
(52) U.S. Cl. ........................................................ 361/42
(58) Field of Search ........................................... 361/42

(56) References Cited

U.S. PATENT DOCUMENTS

| | | | |
|---|---|---|---|
| 3,309,571 A | 3/1967 | Gilker | |
| 3,538,477 A | 11/1970 | Walters et al. | |
| 3,702,418 A | 11/1972 | Obenhaus | |
| 3,731,154 A | 5/1973 | Saakovich | |
| 3,864,649 A | 2/1975 | Doyle | |
| 3,872,354 A | 3/1975 | Nestor et al. | |
| 3,949,336 A | 4/1976 | Dietz | |
| 4,002,951 A | 1/1977 | Halbeck | |
| 4,034,266 A | 7/1977 | Virani et al. | |
| 4,034,360 A | 7/1977 | Schweitzer, Jr. | |
| 4,063,299 A | 12/1977 | Munroe | |
| 4,086,549 A | 4/1978 | Slater et al. | |
| 4,223,365 A | 9/1980 | Moran | |
| 4,237,435 A | 12/1980 | Cooper et al. | |
| 4,316,230 A | 2/1982 | Hansen | |
| 4,442,470 A | 4/1984 | Misencik | |
| 4,521,824 A | 6/1985 | Morris et al. | |

(Continued)

FOREIGN PATENT DOCUMENTS

| | | |
|---|---|---|
| AU | 759587 | 7/2003 |
| EP | 0 526 071 A | 2/1993 |
| GB | 830018 | 3/1960 |
| GB | 2207823 | 2/1989 |
| GB | 2290181 A | 12/1995 |
| WO | WO 96/01484 A | 1/1996 |
| WO | PCT/US99/19319 | 3/2000 |
| WO | PCT/US00/22955 | 3/2001 |
| WO | PCT/US01/32562 | 4/2002 |
| WO | WO 2004/070751 A3 | 8/2004 |
| WO | WO 2004/070752 A3 | 8/2004 |

*Primary Examiner*—Brian Sircus
*Assistant Examiner*—James Demakis
(74) *Attorney, Agent, or Firm*—Paul J. Sutton

(57) ABSTRACT

Resettable circuit interrupting devices, such as GFCI devices, that include an independent trip mechanism and a reset lockout mechanism are provided. The trip mechanism operates independently of a circuit interrupting mechanism used to break the connection, and the reset lockout mechanism prevents the resetting of electrical connections between input and output conductors if the circuit interrupting mechanism is non-operational or if an open neutral condition exists.

24 Claims, 11 Drawing Sheets

U.S. PATENT DOCUMENTS

| | | |
|---|---|---|
| 4,567,456 A | 1/1986 | Legatti |
| 4,574,260 A | 3/1986 | Franks |
| 4,578,732 A | 3/1986 | Draper |
| 4,587,588 A | 5/1986 | Goldstein |
| 4,595,894 A | 6/1986 | Doyle et al. |
| 4,630,015 A | 12/1986 | Gernhardt et al. |
| 4,631,624 A | 12/1986 | Dorak et al. |
| 4,719,437 A | 1/1988 | Yun |
| 4,802,052 A | 1/1989 | Brant et al. |
| 4,851,951 A | 7/1989 | Foster, Jr. |
| 4,901,183 A | 2/1990 | Lee |
| 4,967,308 A | 10/1990 | Morse |
| 4,979,070 A | 12/1990 | Bodkin |
| 5,148,344 A | 9/1992 | Rao et al. |
| 5,185,687 A | 2/1993 | Beihoff et al. |
| 5,202,662 A | 4/1993 | Bienwald et al. |
| 5,223,810 A | 6/1993 | Van Haaren |
| 5,224,006 A | 6/1993 | MacKenzie et al. |
| 5,229,730 A | 7/1993 | Legatti et al. |
| 5,347,248 A | 9/1994 | Herbert |
| 5,363,269 A | 11/1994 | McDonald |
| 5,418,678 A | 5/1995 | McDonald |
| 5,448,443 A | 9/1995 | Muelleman |
| 5,477,412 A | 12/1995 | Neiger et al. |
| 5,510,760 A | 4/1996 | Marcou et al. |
| 5,517,165 A | 5/1996 | Cook |
| 5,541,800 A | 7/1996 | Misencik |
| 5,555,150 A | 9/1996 | Newman |
| 5,594,398 A | 1/1997 | Marcou et al. |
| 5,600,524 A | 2/1997 | Neiger et al. |
| 5,617,284 A | 4/1997 | Paradise |
| 5,625,285 A | 4/1997 | Virgilo et al. |
| 5,628,394 A | 5/1997 | Benke et al. |
| 5,631,798 A | 5/1997 | Seymour et al. |
| 5,637,000 A | 6/1997 | Osterbrock et al. |
| 5,661,623 A | 8/1997 | McDonald et al. |
| 5,665,648 A | 9/1997 | Little |
| 5,694,280 A | 12/1997 | Zhou |
| 5,706,155 A | 1/1998 | Neiger et al. |
| 5,729,417 A | 3/1998 | Neiger et al. |
| 5,805,397 A | 9/1998 | MacKenzie |
| 5,815,363 A | 9/1998 | Chu |
| 5,825,602 A | 10/1998 | Tosaka et al. |
| 5,844,765 A | 12/1998 | Kato et al. |
| 5,847,913 A | 12/1998 | Turner et al. |
| 5,875,087 A | 2/1999 | Spencer et al. |
| 5,933,063 A | 8/1999 | Keung et al. |
| 5,943,198 A | 8/1999 | Hirsh et al. |
| 5,956,218 A | 9/1999 | Berthold |
| 5,963,408 A | 10/1999 | Neiger et al. |
| 6,040,967 A | 3/2000 | DiSalvo |
| 6,052,265 A | 4/2000 | Zaretsky et al. |
| 6,226,161 B1 | 5/2001 | Neiger et al. |
| 6,246,558 B1 | 6/2001 | DiSalvo et al. |
| 6,252,407 B1 | 6/2001 | Gershen |
| 6,282,070 B1 * | 8/2001 | Ziegler et al. ........... 361/42 |
| 6,288,882 B1 | 9/2001 | DiSalvo et al. |
| 6,309,248 B1 | 10/2001 | King |
| 6,324,043 B1 | 11/2001 | Turner |
| 6,381,112 B1 | 4/2002 | DiSalvo |
| 6,437,700 B1 | 8/2002 | Herzfeld et al. |
| 6,437,953 B2 | 8/2002 | Disalvo et al. |
| D462,660 S | 9/2002 | Huang et al. |
| 6,580,344 B2 | 6/2003 | Li |
| 6,590,172 B1 | 7/2003 | Gadre et al. |
| 6,590,753 B1 | 7/2003 | Finlay |
| 6,621,388 B1 | 9/2003 | Macbeth |
| 6,646,838 B2 | 11/2003 | Ziegler et al. |
| 6,657,834 B2 | 12/2003 | DiSalvo |
| 6,671,145 B2 | 12/2003 | Germain et al. |
| 6,693,779 B2 | 2/2004 | DiSalvo |
| 6,717,782 B2 | 4/2004 | DiSalvo et al. |
| 6,771,152 B2 | 8/2004 | Germain et al. |
| 6,864,766 B2 | 3/2005 | DiSalvo et al. |
| 6,864,769 B2 | 3/2005 | Germain et al. |
| 2003/0085783 A1 | 5/2003 | Macbeth |
| 2003/0151478 A1 | 8/2003 | Rodasaljevic et al. |

* cited by examiner

CIRCUIT INTERRUPTING SYSTEM WITH INDEPENDENT TRIP AND RESET LOCKOUT

CROSS-REFERENCE TO RELATED APPLICATIONS

This application is a continuation of U.S. application Ser. No. 09/939,370, filed Aug. 24, 2001 and which was granted U.S. Pat. No. 6,646,838 on Nov. 11, 2003; which is a continuation of U.S. application Ser. No. 09/369,759, filed Aug. 6, 1999 and which was granted U.S. Pat. No. 6,282,070 on Aug. 28, 2001; which in turn is a continuation-in-part of U.S. application Ser. No. 09/138,955, filed Aug. 24, 1998 and which was granted U.S. Pat. No. 6,040,967 on Mar. 21, 2000, all of which are incorporated herein in their entirety by reference.

BACKGROUND

1. Field

The present application is directed to a family of resettable circuit interrupting devices and systems that includes ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms. More particularly, the present application is directed to circuit interrupting devices that include a trip portion that can break electrical conductive paths independent of the operation of a circuit interrupting portion used to sense faults and break the conductive paths when a fault is sensed, and a reset lock out portion capable of preventing the device from resetting if the circuit interrupting portion is not functioning properly or if an open neutral condition exists.

2. Description of the Related Art

The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters, for example. Presently available GFCI devices, such as the device described in commonly owned U.S. Pat. No. 4,595,894, use an electrically activated trip mechanism to mechanically break an electrical connection between one or more input and output conductors. Such devices are resettable after they are tripped by, for example, the detection of a ground fault. In the device discussed in the '894 patent, the trip mechanism used to cause the mechanical breaking of the circuit (i.e., the connection between input and output conductors) includes a solenoid (or trip coil). A test button is used to test the trip mechanism and circuitry used to sense faults, and a reset button is used to reset the electrical connection between input and output conductors.

However, instances may arise where an abnormal condition, caused by for example a lightning strike, occurs which may result not only in a surge of electricity at the device and a tripping of the device but also a disabling of the trip mechanism used to cause the mechanical breaking of the circuit. This may occur without the knowledge of the user. Under such circumstances an unknowing user, faced with a GFCI which has tripped, may press the reset button which, in turn, will cause the device with an inoperative trip mechanism to be reset without the ground fault protection available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (versus load) side of the GFCI device, an instance may arise where a current path is created from the phase (or hot) wire supplying power to the GFCI device through the load side of the device and a person to ground. In the event that an open neutral condition exists, current GFCI devices which have tripped, may be reset even though the open neutral condition may remain.

Commonly owned application Ser. No. 09/138,955, filed Aug. 24, 1998, which is incorporated herein in its entirety by reference, describes a family of resettable circuit interrupting devices capable of locking out the reset portion of the device if the circuit interrupting portion is non-operational or if an open neutral condition exists.

SUMMARY

The present application relates to a family of resettable circuit interrupting devices that include a circuit interrupting portion, a reset portion, a reset lockout portion and a trip portion. The reset lockout portion prevents the resetting of electrical conductive paths between input and output conductors if the circuit interrupting portion used to break the conductive path is non-operational or if an open neutral condition exists. The trip portion operates independently of the circuit interrupting portion and facilitates breaking of the conductive path between input and output conductors so that the trip portion can break the conductive path whether or not the circuit interrupting portion is operating properly.

In one embodiment, the circuit interrupting device includes a housing, a first electrical conductive path disposed at least partially within said housing and capable of being electrically connected to a source of electricity, and a second electrical conductive path disposed at least partially within said housing and capable of conducting electrical current to a load when electrically continuity between said first and second electrical conductive paths is made. A circuit interrupting portion is disposed within the housing and is configured to break the continuity between the first and second conductive paths upon the occurrence of a predetermined condition. A reset portion is disposed at least partially within the housing and is configured to make electrical continuity between the first and second conductive paths. A reset lockout portion prevents the making of electrical continuity between the first and second conductive paths if the circuit interrupting portion is not operating properly (i.e., the components used to make and break electrical continuity fail or the sensing circuitry fails). A trip portion is also disposed at least partially within the housing and is configured to break the continuity between the conductive paths independently of the circuit interrupting portion operation. In this configuration, the device can be tripped whether or not the circuit interrupting portion is operating properly.

In one embodiment, the trip portion includes a trip button that is accessible from an exterior surface of the housing and a trip arm extending from the trip button. The trip arm is configured to facilitate mechanical breaking of electrical continuity between the first and second electrical conductive paths upon depression of the trip button.

The circuit interrupting portion includes a circuit interrupter that is used to facilitate making and breaking of electrical continuity between the first and second electrical conductive paths, and sensing circuitry used to sense the occurrence of a predetermined condition, such as a ground fault, an arc fault, an appliance leakage fault or an immersion fault.

In an alternative embodiment, the circuit interrupting device includes a housing, a first electrical conductor disposed at least partially within the housing and capable of being electrically connected to a source of electricity, and a second electrical conductor disposed at least partially within the housing and capable of conducting electrical current to a load when electrically connected to the first electrical conductor. A circuit interrupting portion is disposed within the housing and is configured to cause electrical discontinuity between the first and second conductors upon the occurrence of one of the predetermined conditions. A reset portion configured to reestablish electrical continuity between the first and second conductors, and a reset lockout portion is used to prevent reestablishment of electrical continuity between the conductors if the circuit interrupting portion is not operating properly. A trip portion having a trip button extending through the housing is configured to activate a trip operation in response to the trip button being manually depressed. The trip operation is independent of the circuit interrupting portion operation.

The present application also relates to a method for testing the operation of resettable circuit interrupting devices, such as the above-described family of resettable circuit interrupting devices. In one embodiment, the method involves manually activating a trip portion of the circuit interrupting device to break electrical continuity between input and output conductive paths and to enable a reset lockout portion so as to inhibit reestablishing electrical continuity between the input and output conductive paths. After the trip portion is activated, the reset portion of the device is activated to perform a reset operation. Operation of the reset portion and the reset lockout portion are interdependent with the operation of the circuit interrupting portion of the device, such that if the circuit interrupting portion is operational when the reset operation is performed, the reset lockout portion is disabled and electrical continuity between the input and output conductive paths is reset. If the circuit interrupting portion is non-operational (e.g., a component in the circuit interrupting portions sensing circuitry fails or its electromechanical components fail), the reset operation cannot be completed. In such instances, the reset lockout portion remains enabled and electrical continuity between the input and output conductive paths is not reestablished.

BRIEF DESCRIPTION OF THE DRAWINGS

Preferred embodiments of the present application are described herein with reference to the drawings in which similar elements are given similar reference characters, wherein.

DETAILED DESCRIPTION

Figure 1:
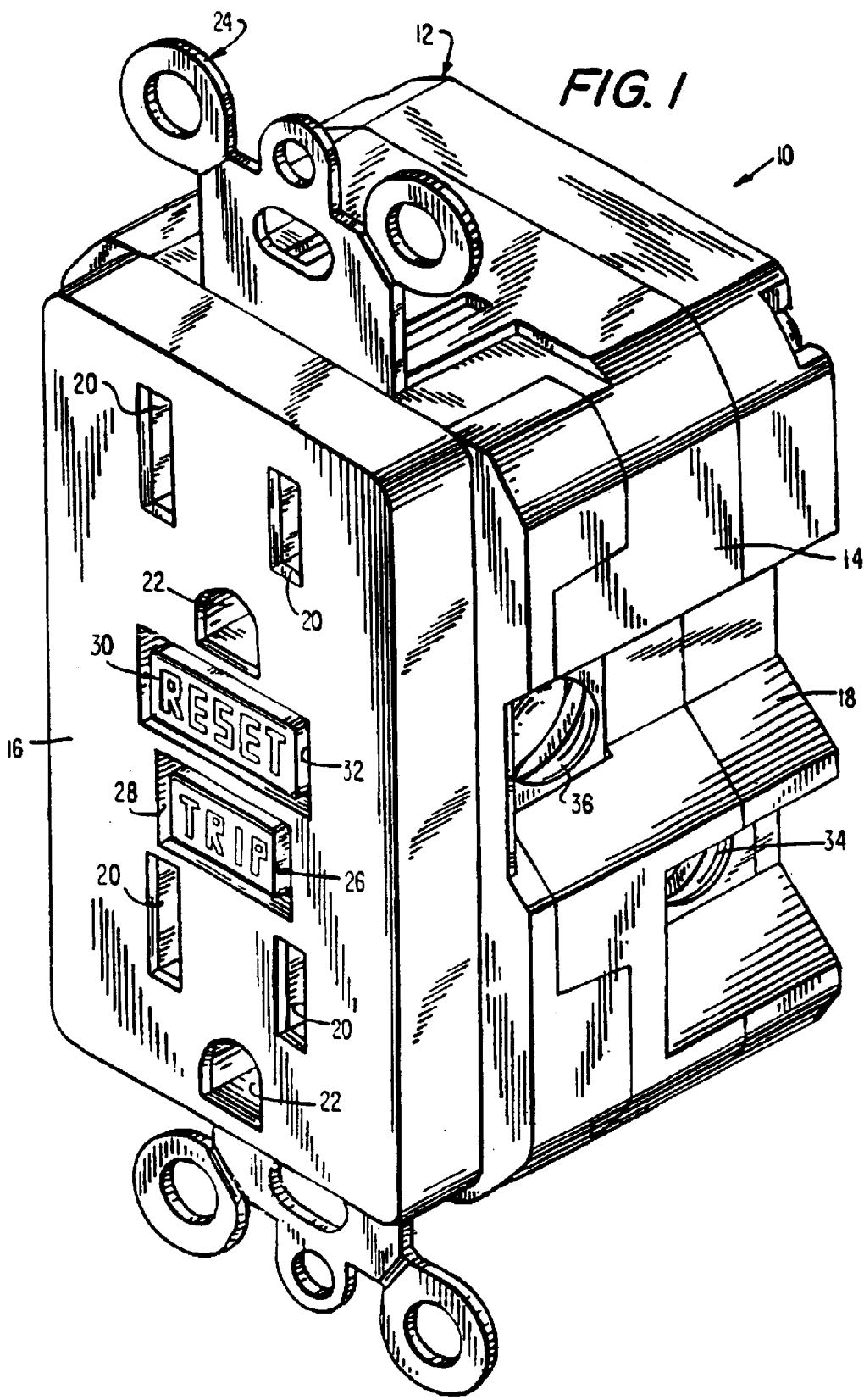
FIG. 1 is a perspective view of an exemplary ground fault circuit interrupting device according to the present application.

The present application relates to a family of resettable circuit interrupting devices for breaking and making electrical connections between input and output conductive paths associated with the devices and to systems incorporating such devices. The family of devices include ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's). Generally, each circuit interrupting device according to the present application has a circuit interrupting portion, a reset portion, a reset lockout portion and a trip portion, which will be described in more detail below.

The circuit interrupting and reset portions preferably use electromechanical components to break and make the conductive path between input and output conductors. More particularly, the circuit interrupting portion is used to break electrical continuity between input and output conductive paths (or conductors) upon the detection of a fault. Operation of the reset and reset lockout portions is in conjunction with the operation of the circuit interrupting, so that the electrical connection between conductive paths cannot be reset if the circuit interrupting portion is non-operational and/or if an open neutral condition exists.

The trip portion operates independently of the circuit interrupting portion so that in the event the circuit interrupting portion becomes non-operational the device can still be tripped. Preferably, the trip portion is manually activated and uses mechanical components to break the electrical connections. However, the trip portion may use electrical circuitry and/or electromechanical components to break the electrical connections.

For the purpose of the present application, the structure or mechanisms, used in the circuit interrupting devices, shown in the drawings and described hereinbelow are incorporated into a GFCI receptacle suitable for installation in a single-gang junction box in a home. However, the mechanisms according to the present application can be included in any of the various devices in the family of resettable circuit interrupting devices.

Turning now to FIG. 1, the GFCI receptacle 10 has a housing 12 consisting of a relatively central body 14 to which a face or cover portion 16 and a rear portion 18 are removably secured. The face portion 16 has entry ports 20 for receiving normal or polarized prongs of a male plug of the type normally found at the end of a lamp or appliance cord set (not shown), as well as ground-prong-receiving openings 22 to accommodate a three-wire plug. The receptacle also includes a mounting strap 24 used to fasten the receptacle to a junction box.

A trip actuator 26, preferably a button, which is part of the trip portion to be described in more detail below, extends through opening 28 in the face portion 16 of the housing 12. The trip actuator is used, in this exemplary embodiment, to mechanically trip the GFCI receptacle, i.e., break the electrical connection between input and output conductive paths, independent of the operation of the circuit interrupting portion.

A reset actuator 30, preferably a button, which is part of the reset portion, extends through opening 32 in the face portion 16 of the housing 12. The reset button is used to activate the reset operation, which re-establishes electrical continuity between the input and output conductive paths, i.e., resets the device, if the circuit interrupting portion is operational.

Electrical connections to existing household electrical wiring are made via binding screws 34 and 36, where screw 34 is an input (or line) connection point and screw 36 is an output (or load) connection point. It should be noted that two additional binding screws (not shown) are located on the opposite side of the receptacle 10. Similar to binding screws 34 and 36, these additional binding screws provide input and output connection points. Further, the input connections are for line side phase (hot) and neutral conductors of the household wiring, and the output connections are for load side phase (hot) and neutral conductors of the household wiring. The plug connections are also considered output conductors. A more detailed description of a GFCI receptacle is provided in U.S. Pat. No. 4,595,894 which is incorporated herein in its entirety by reference. It should also be noted that binding screws 34 and 36 are exemplary of the types of wiring terminals that can be used to provide the electrical connections. Examples of other types of wiring terminals include set screws, pressure clamps, pressure plates, push-in type connections, pigtails and quick-connect tabs.

Figure 2:
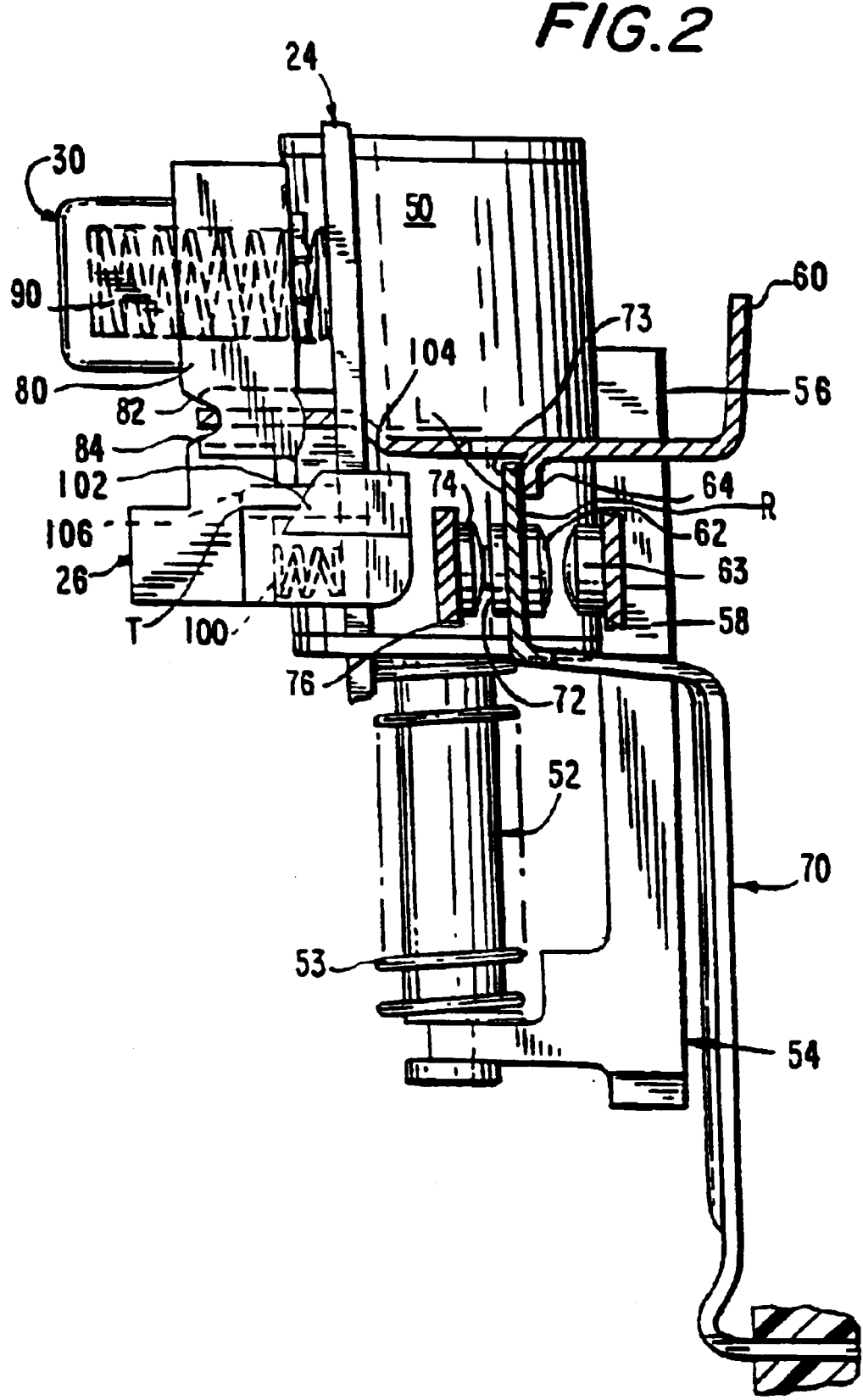
FIG. 2 is side elevational view, partly in section, of components of an independent trip mechanism and a reset mechanism for the GFCI device shown in FIG. 1, illustrating the components when the circuit interrupting device is in a set or circuit making position.

Referring to FIG. 2, the conductive path between the input connection point 34 and the output connection point 36 (or the entry ports 20) includes contact arm 70 which is movable between stressed and unstressed positions, movable contact 72, fixed contact 74 and contact arm 76. A movable latching member 60 and contacts 72 and 74 are used to make and break the conductive path.

There is also shown in FIG. 2, mechanical components used during circuit interrupting and device reset operations according to one embodiment of the present application. Although these components shown in the drawings are electromechanical in nature, the present application also contemplates using semiconductor type circuit interrupting and reset components, as well as other mechanisms capable or making and breaking electrical continuity.

Figure 8:
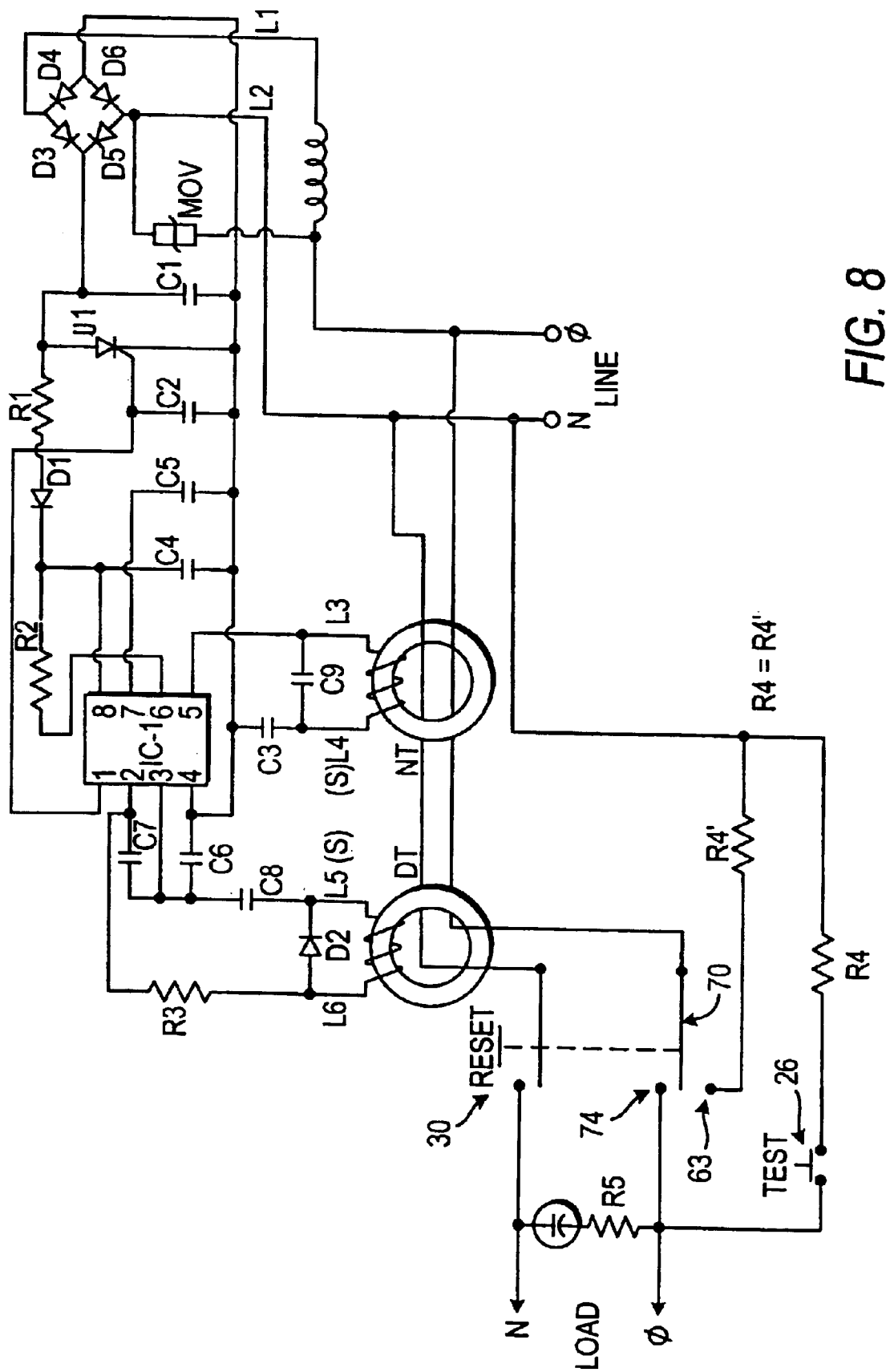
FIG. 8 is a schematic diagram of a circuit for detecting ground faults and resetting the circuit interrupting device of FIG. 1.

The circuit interrupting portion has a circuit interrupter and electronic circuitry capable of sensing faults, e.g., current imbalances, on the hot and/or neutral conductors. In a preferred embodiment for the GFCI receptacle, the circuit interrupter includes a coil assembly 50, a plunger 52 responsive to the energizing and de-energizing of the coil assembly and a banger 54 connected to the plunger 52. The banger 54 has a pair of banger dogs 56 and 58 which interact with movable latching member 60 used to set and reset the connection between input and output conductors. The coil assembly 50 is activated in response to the sensing of a ground fault by, for example, the sense circuitry shown in FIG. 8. FIG. 8 shows conventional circuitry for detecting ground faults that includes a differential transformer that senses current imbalances.

The reset portion includes reset button 30, movable latching member 60 connected to the reset button 30, latching finger 64 and reset contacts 62 and 63 that temporarily activate the circuit interrupting portion when the reset button is depressed. Preferably, the reset contacts 62 and 63 are normally open momentary contacts. The latching finger 64 is used to engage side R of the contact arm 70 and move the arm 70 back to its stressed position where contact 72 touches contact 74.

The movable latching member 60 is, in this embodiment, common to each portion (i.e., the trip, circuit interrupting, reset and reset lockout portions) and used to facilitate making, breaking or locking out of the electrical connections between the input and output conductive paths. However, the circuit interrupting devices according to the present application also contemplate embodiments where there is no common mechanism or member between each portion or between certain portions.

Figure 3:
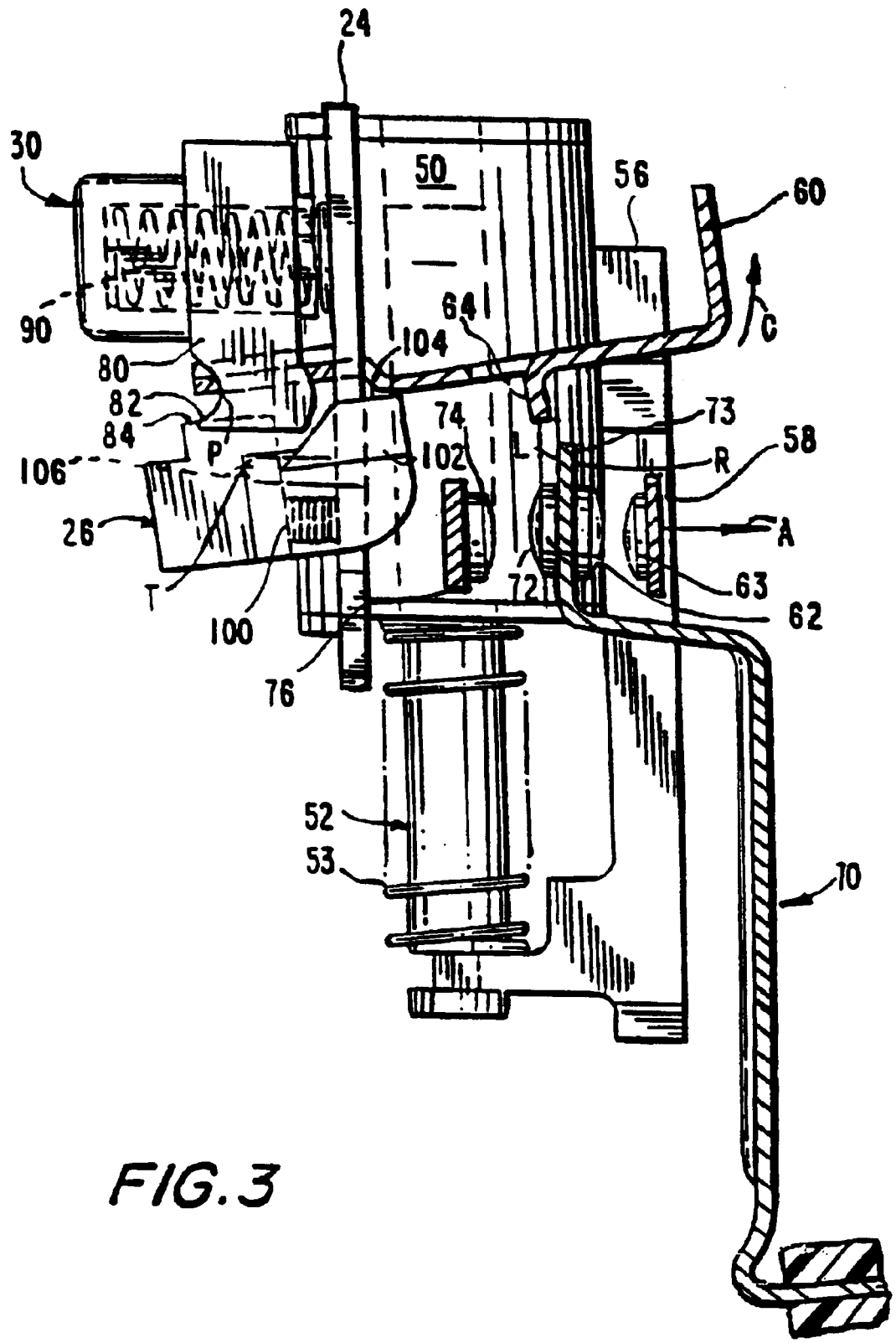
FIG. 3 is a side elevational view similar to FIG. 2, illustrating components of the independent trip mechanism when the circuit interrupting device is in a circuit breaking position.

In the embodiment shown in FIGS. 2 and 3, the reset lockout portion includes latching finger 64 which after the device is tripped, engages side L of the movable arm 70 and blocks the movable arm 70 from moving so that contacts 72 and 74 are prevented from touching. In this embodiment, latching finger 64 acts as an active inhibitor that prevents the contacts from touching. Alternatively, the natural bias of movable arm 70 can also be used as a passive inhibitor that prevents contacts 72 and 74 from touching.

Figure 4:
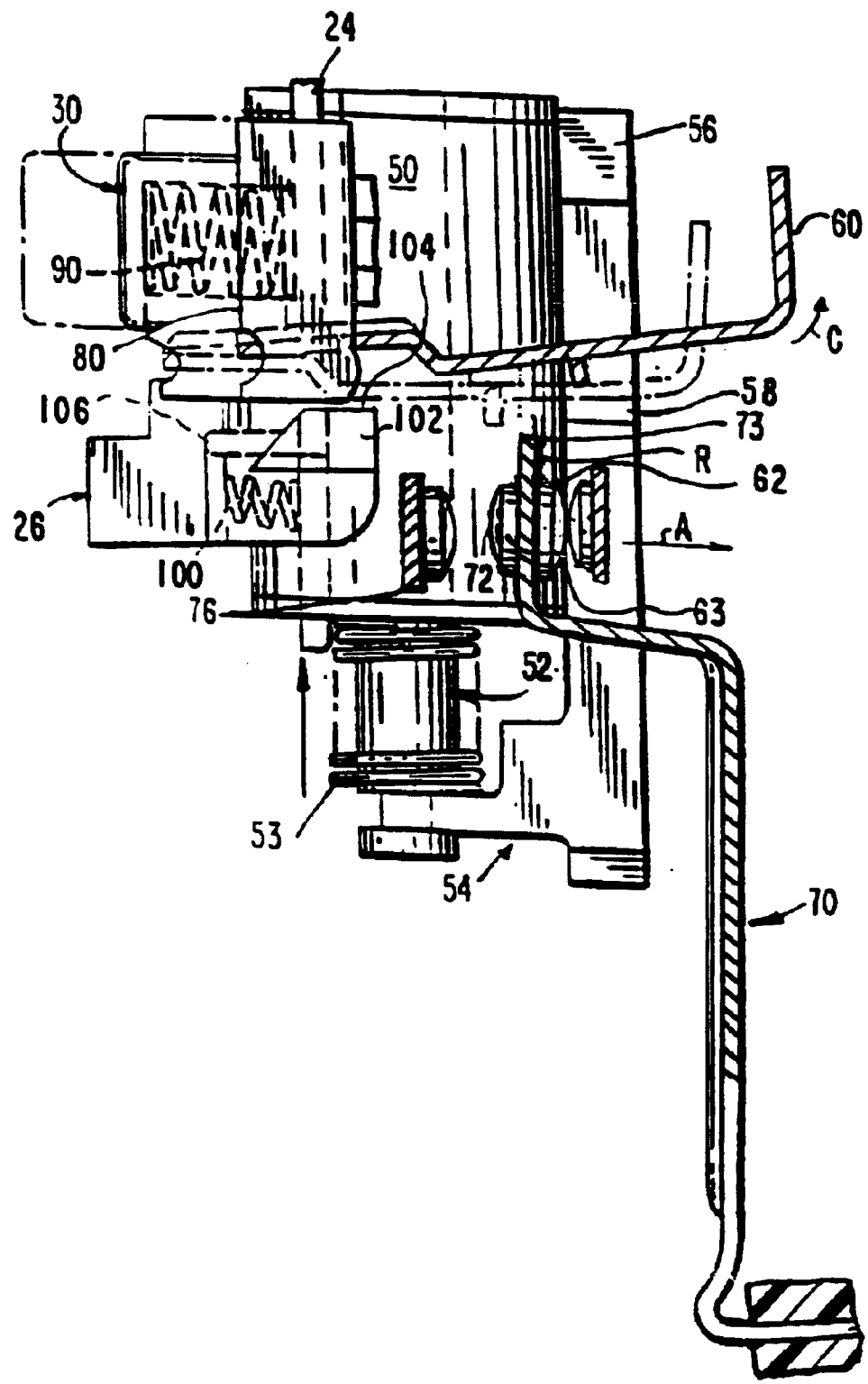
FIG. 4 is a side elevational view similar to FIG. 2, illustrating the components of the reset mechanism during reset operation of the circuit interrupting device.

Referring now to FIGS. 2–4, the mechanical components of the circuit interrupter and reset mechanisms in various stages of operation are shown. In FIG. 2, the GFCI receptacle is shown in a set position where movable contact arm 70 is in a stressed condition so that movable contact 72 is in electrical engagement with fixed contact 74 of contact arm 76. If the sensing circuitry of the GFCI receptacle senses a ground fault, the coil assembly 50 is energized to draw plunger 52 into the coil assembly 50 so that banger 54 moves upwardly. As the banger moves upwardly, the banger front dog 58 strikes the latch member 60 causing it to pivot in a counterclockwise direction C about the joint created by the top edge 82 and inner surface 84 of finger 80. The movement of the latch member 60 removes the latching finger 64 from engagement with side R of the remote end 73 of the movable contact arm 70, and permits contact arm 70 to return to its pre-stressed condition opening contacts 72 and 74, seen in FIG. 3. It should be noted that the description thus far has been in terms of a single latch member 60 and a single contact arm 70. However, there are preferably two sets of latch members 60 and contact arms 70: one set for the phase (or hot) conductors (line and load side); and the other set for the neutral conductors (line and load side). Further, the banger 54 preferably has two sets of banger dogs: one set for the phase conductors (line and load side); and the other set for the neutral conductors (line and load side).

Figure 6:
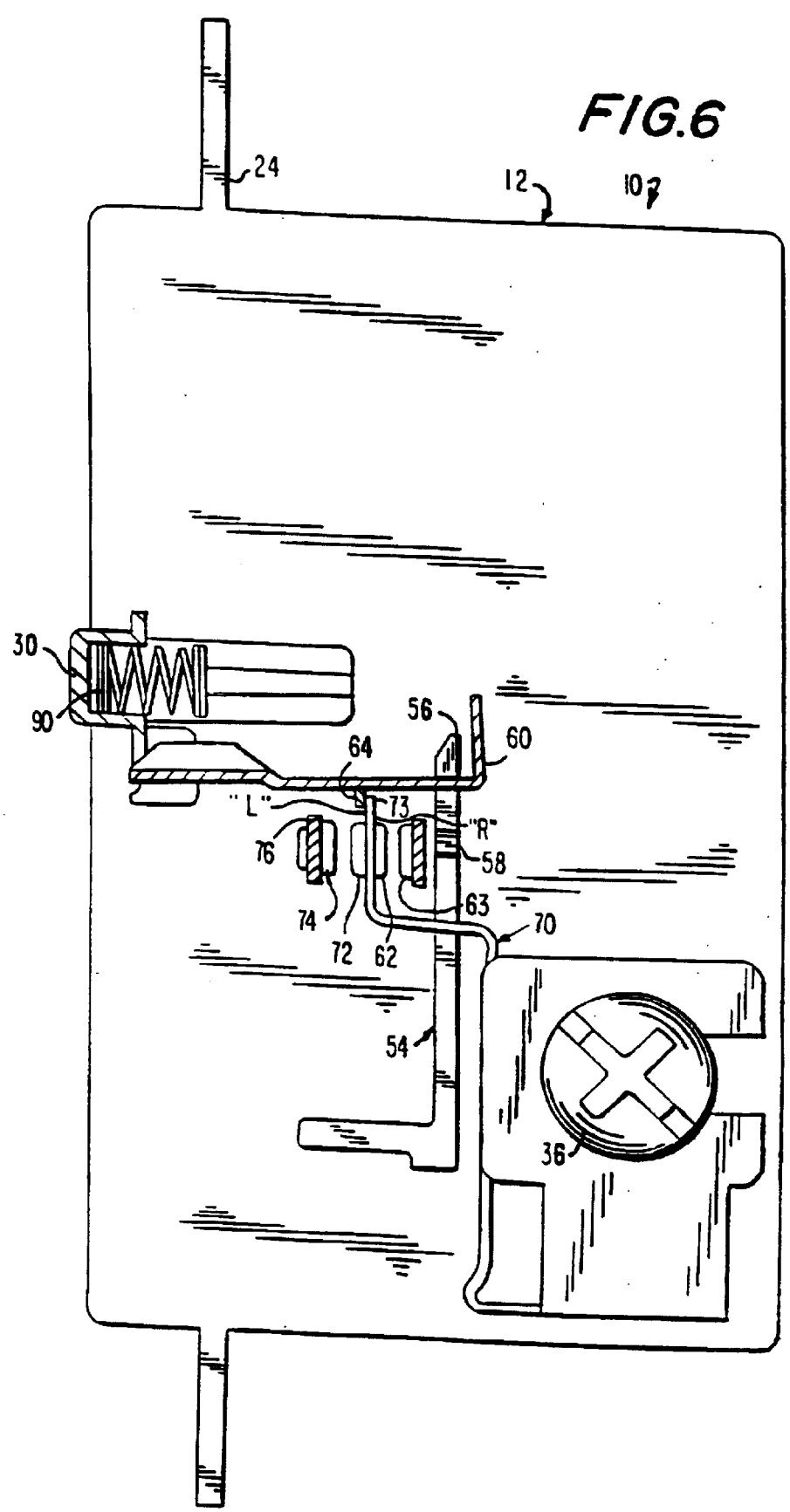

After tripping, the coil assembly 50 is de-energized so that spring 53 returns plunger 52 to its original extended position and banger 54 moves to its original position releasing latch member 60. At this time the latch member 60 is in a lockout position where latch finger 64 inhibits movable contact 72 from engaging fixed contact 74, as seen in FIG. 6. In this embodiment, latching finger 64 acts as an active inhibitor that prevents the contacts from touching. Alternatively, the natural bias of movable arm 70 can also be used as a passive inhibitor that prevents contacts 72 and 74 from touching.

Figure 7:
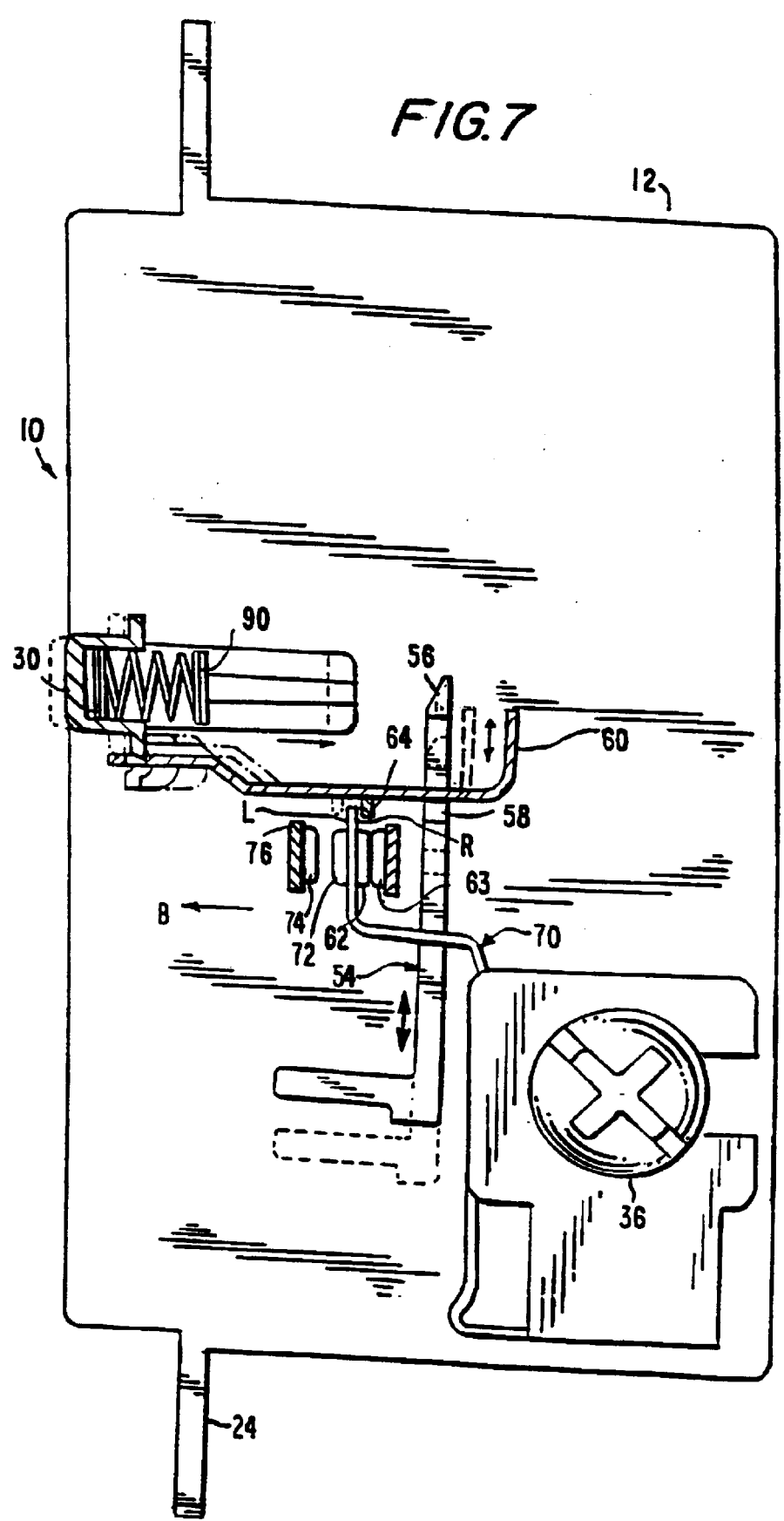

To reset the GFCI receptacle so that contacts 72 and 74 are closed and continuity between the input and output conductors is reestablished, the reset button 30 is depressed sufficiently to overcome the bias force of return spring 90 and move the latch member 60 in the direction of arrow A, seen in FIG. 4. While the reset button 30 is being depressed, latch finger 64 contacts side L of the movable contact arm 70 and continued depression of the reset button 30 forces the latch member to overcome the stress force exerted by the arm 70 causing the reset contact 62 on the arm 70 to close on reset contact 63. Closing the reset contacts activates the operation of the circuit interrupter by, for example simulating a fault, so that plunger 52 moves the banger 54 upwardly so that the banger dog 58 strikes the latch member 60 pivoting the latch member in the direction of arrow C while the latch member 60 continues to move in the direction of arrow A. As a result, the latch finger 64 is lifted over side L of the remote end 73 of the movable contact arm 70 onto side R of the remote end of the movable contact arm, as seen in FIG. 7. Contact arm 70 returns to its unstressed position opening contacts 62 and 63 so as to terminate the activation of the circuit interrupting portion, thereby de-energizing the coil assembly 50.

Figure 5:
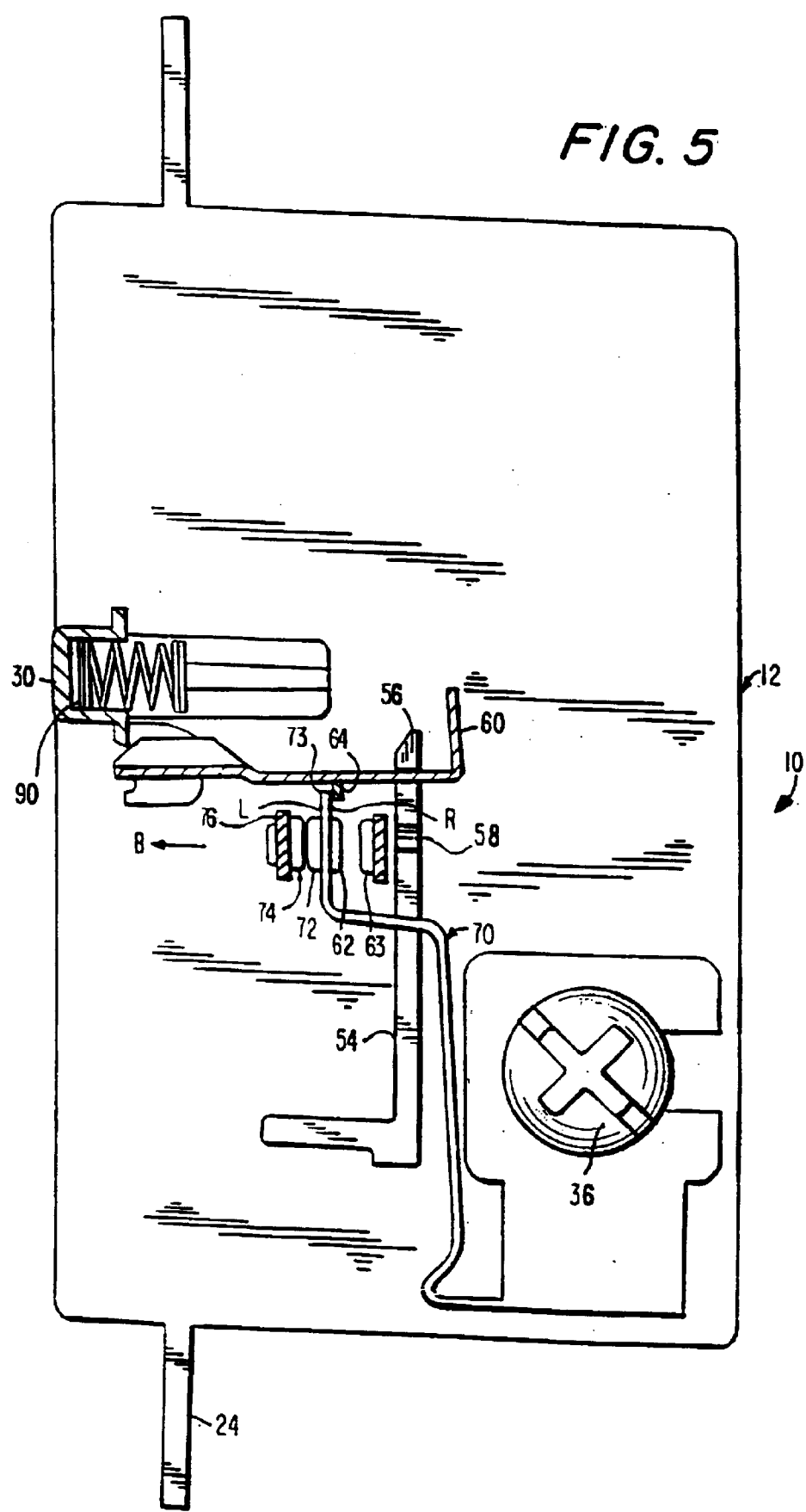
FIGS. 5–7 are schematic representations of one embodiment of the reset mechanism of the present application, illustrating a latching member used to make an electrical connection between input and output conductors and to relate the reset mechanism with the operation of the circuit interrupter.

After the circuit interrupter operation is activated, the coil assembly 50 is de-energized so that so that plunger 52 returns to its original extended position, and banger 54 releases the latch member 60 so that the latch finger 64 is in a reset position, seen in FIG. 5. Release of the reset button causes the latching member 60 and movable contact arm 70 to move in the direction of arrow B until contact 72 electrically engages contact 74.

Referring again to FIGS. 2 and 3 the trip portion according to the present application includes a trip actuator 26, preferably a button, that is movable between a set position, where contacts 72 and 74 are permitted to close or make contact, as seen in FIG. 2, and a trip position where contacts 72 and 74 are caused to open, as seen in FIG. 3. Spring 100 normally biases trip button 26 toward the set position. The trip portion also includes a trip arm 102 that extends from the trip button 26 so that a surface 104 of the trip arm 102 moves into contact with the movable latching member 60 when the trip button is moved toward the trip position. When the trip button 26 is in the set position, surface 104 of trip arm 102 can be in contact with or close proximity to the movable latching member 60, as seen in FIG. 2.

In operation, upon depression of the trip button 26, the trip button pivots about point T of pivot arm 106 extending from strap 24 so that the surface 104 of the trip arm 102 can contact the movable latching member 60. As the trip button is moved toward the trip position, trip arm 102 also enters the path of movement of the finger 80 associated with reset button 30 thus blocking the finger 80 from further movement in the direction of arrow A. By blocking the movement of the finger 80, the trip arm 102 inhibits the activation of the reset operation and, thus, inhibits simultaneous activation of the trip and reset operations. Further depression of the trip button 26 causes the movable latching member 60 to pivot about point P (seen in FIG. 3) in the direction of arrow C. Pivotal movement of the latching member 60 causes latching finger 64 to move out of contact with the movable contact arm 70 so that the arm 70 returns to its unstressed condition, and the conductive path is broken. Resetting of the device is achieved as described above.

Figure 9:
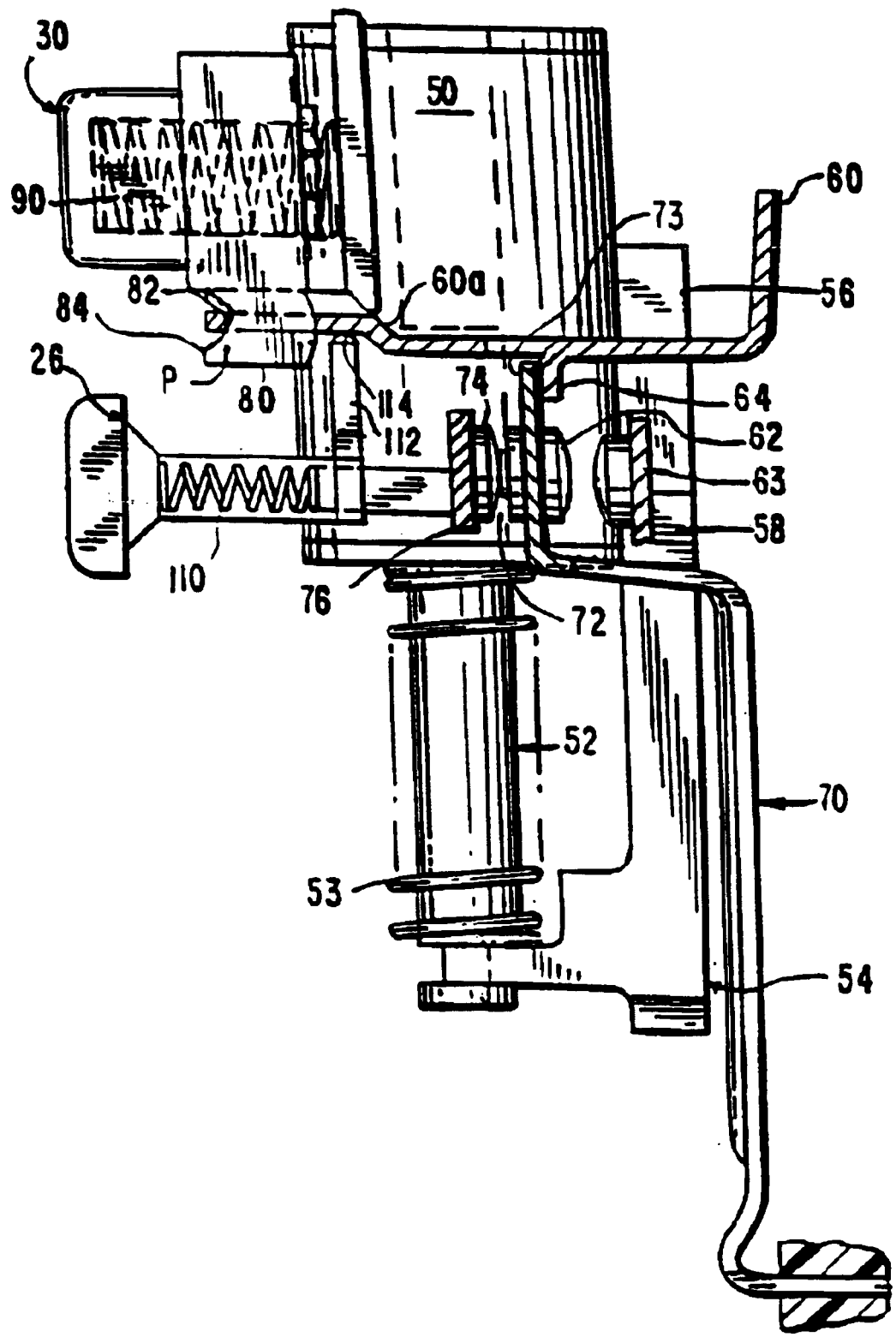
FIG. 9 is side elevational view, partly in section, of components of an alternative embodiment of the independent trip mechanism, illustrating the components when the circuit interrupting device is in a set or circuit making position.
Figure 10:
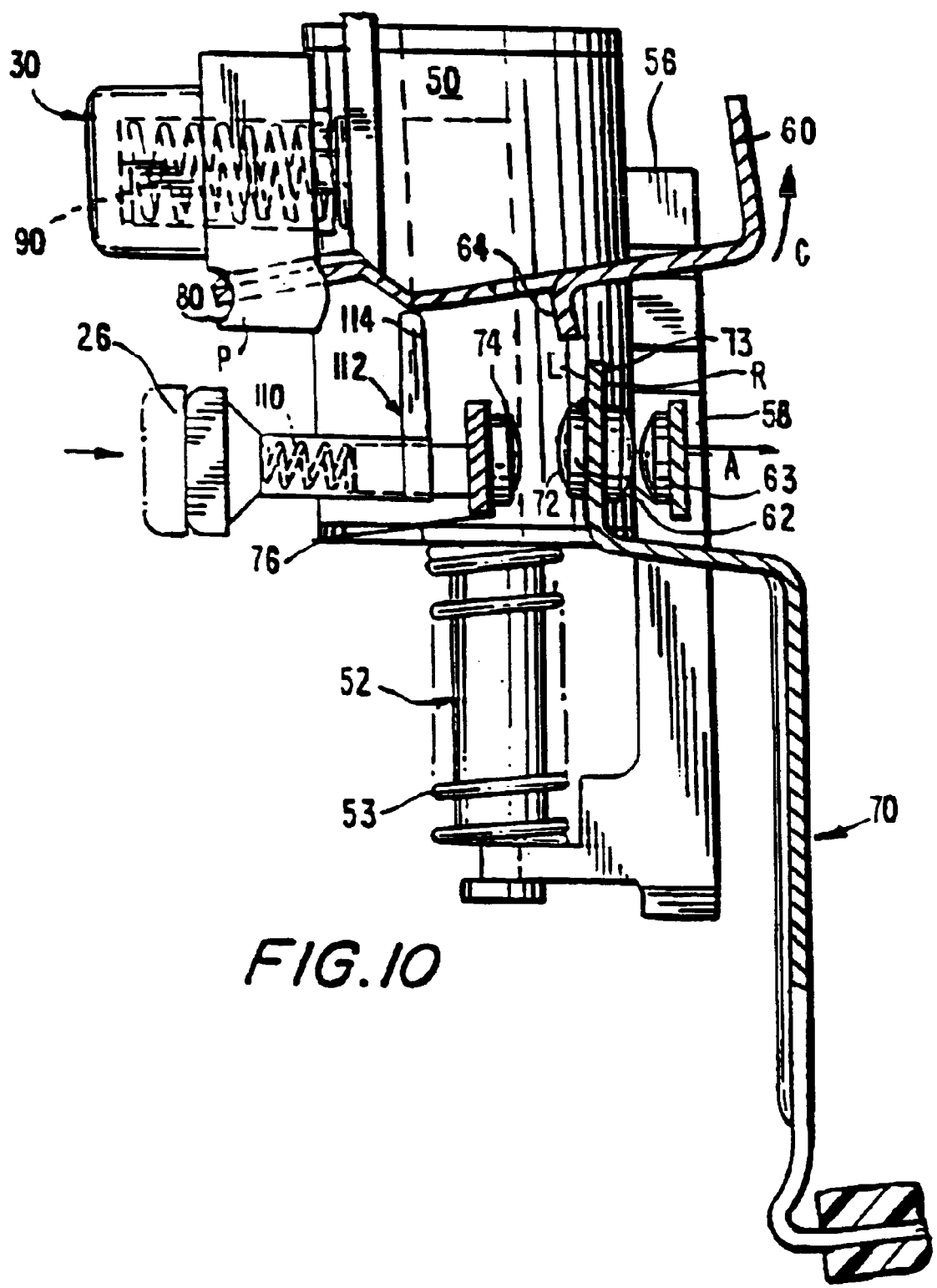
FIG. 10 is a side elevational view similar to FIG. 9, illustrating components of the alternative independent trip mechanism when the circuit interrupting device is in a circuit breaking position.

An alternative embodiment of the trip portion will be described with reference to FIGS. 9 and 10. In this embodiment, the trip portion includes a trip button 26 that is movable between a set position, where contacts 72 and 74 are permitted to close or make contact, as seen in FIG. 9, and a trip position where contacts 72 and 74 are caused to open, as seen in FIG. 10. Spring 110 normally biases trip button 26 toward the set position. The trip portion also includes a trip arm 112 that extends from the trip button 26 so that a distal end 114 of the trip arm is in movable contact with the movable latching member 60. As noted above, the movable latching member 60 is, in this embodiment, common to the trip, circuit interrupting, reset and reset lockout portions and used to make, break or lockout the electrical connections between the input and output conductive paths.

In this embodiment, the movable latching member 60 includes a ramped portion 60a which facilitates opening and closing of electrical contacts 72 and 74 when the trip button 26 is moved between the set and trip positions, respectively. To illustrate, when the trip button 26 is in the set position, distal end 114 of trip arm 112 contacts the upper side of the ramped portion 60a, seen in FIG. 9. When the trip button 26 is depressed, the distal end 114 of the trip arm 112 moves along the ramp and pivots the latching member 60 about point P in the direction of arrow C causing latching fingers 64 of the latching member 60 to move out of contact with the movable contact arm 70 so that the arm 70 returns to its unstressed condition, and the conductive path is broken. Resetting of the device is achieved as described above.

Using the reset lockout feature described above permits the resetting of the GFCI device or any of the other devices in the family of circuit interrupting devices only if the circuit interrupting portion is operational. Thus, testing of the circuit interrupting portion occurs during the reset operation. Further, if the circuit interrupting portion becomes non-operational after the device is set, the independent trip mechanism can still trip the device. In other words, the circuit interrupting device according to the present application can be tripped whether or not the circuit interrupting portion is operating properly.

Figure 11:
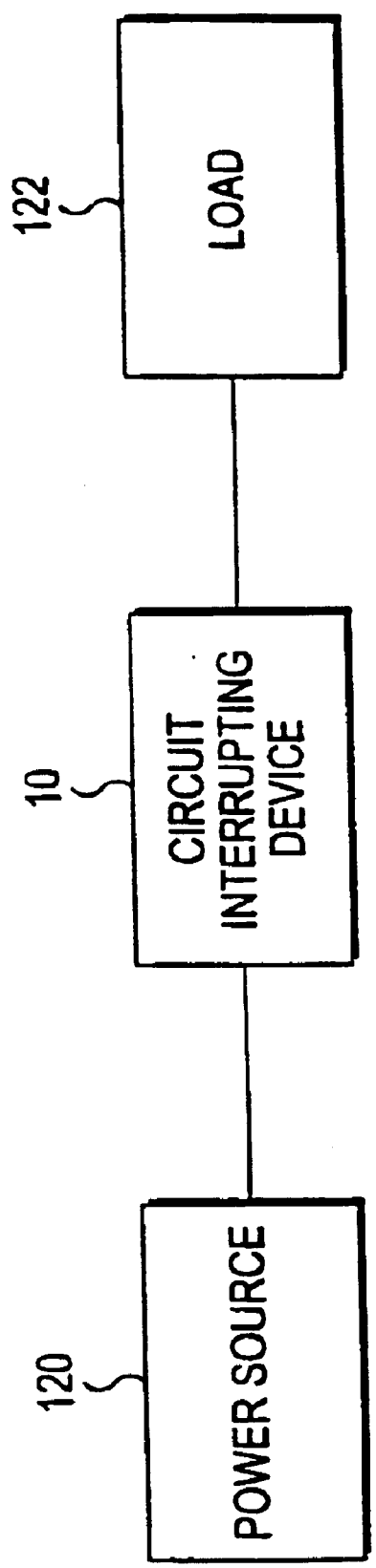
FIG. 11 is a block diagram of a circuit interrupting system according to the present application.

The circuit interrupting device according to the present application can be used in electrical systems, shown in the exemplary block diagram of FIG. 11. The system includes a source of power 120, such as ac power in a home, at least one circuit interrupting device 10 electrically connected to the power source, and one or more loads 122 connected to the circuit interrupting device. As an example of one such system, ac power supplied to single gang junction box in a home may be connected to a GFCI receptacle having the above described independent trip and reset lockout features, is installed in the junction box. Household appliances that are then plugged into the receptacle become the load or loads of the system.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. A circuit interrupting device comprising:
  a housing;
  a first electrical conductive path disposed at least partially within said housing and capable of being electrically connected to a source of electricity;
  a second electrical conductive path disposed at least partially within said housing and capable of conducting electrical current to a load when electrical continuity between said first and second electrical conductive paths is made;

a circuit interrupting portion disposed at least partially within said housing and configured to break the continuity between said first and second conductive paths upon the occurrence of a predetermined condition;

a reset button disposed at least partially within said housing;

a reset portion configured to re-establish electrical continuity between the first and second conductive paths, and configured to temporarily activate the circuit interrupting portion by simulating the occurrence of a predetermined condition when said reset button is depressed;

a reset lockout portion, responsive to the activation state of the circuit interrupting portion, for preventing the making of electrical continuity between said first and second conductive paths if said circuit interrupting portion is non-operational when said reset button is depressed; and a trip portion disposed at least partially within said housing and configured to break the continuity between said first and second conductive paths independently of said circuit interrupting portion operation.

2. The circuit interrupting device according to claim 1, wherein said trip portion comprises a trip actuator accessible from an exterior of said housing and a trip arm extending from said trip actuator, said trip arm being configured to facilitate mechanical breaking of electrical continuity between said first and second electrical conductive paths if said trip actuator is actuated.

3. The circuit interrupting device according to claim 2, wherein said trip actuator comprises a button.

4. The circuit interrupting device according to claim 1, wherein said circuit interrupting portion includes a circuit interrupter used to facilitate making and breaking of electrical continuity between said first and second electrical conductive paths, and sensing circuitry used to sense the occurrence of said predetermined condition.

5. The circuit interrupting device according to claim 1, wherein said predetermined condition comprises a ground fault, an arc fault, an appliance leakage fault or an immersion fault.

6. The circuit interrupting device according to claim 1, wherein said reset lockout portion prevents the making of electrical continuity between said first and second conductive paths if an open neutral condition exists.

7. A circuit interrupting device comprising:

a housing;

a first electrical conductor disposed at least partially within said housing and capable of being electrically connected to a source of electricity;

a second electrical conductor disposed at least partially within said housing and capable of conducting electrical current to a load when electrically connected to said first electrical conductor;

a circuit interrupting portion disposed within said housing and configured to cause electrical discontinuity between said first and second conductors upon the occurrence of a predetermined condition;

a reset button disposed at least partially within said housing;

a reset portion configured to reestablish electrical continuity between the first and second conductors, and configured to temporarily activate the circuit interrupting portion by simulating the occurrence of a predetermined condition when said reset button is depressed;

a reset lockout portion, responsive to the activation state of the circuit interrupting portion, for preventing reestablishment of electrical continuity between said first and second conductors if said circuit interrupting portion is non-operational when said reset button is depressed; and a trip portion having a trip actuator extending through the housing, and configured to activate a trip operation in response to said trip actuator being manually actuated, said trip operation being independent of said circuit interrupting portion operation.

8. The circuit interrupting device according to claim 7, wherein said trip actuator comprises a button.

9. The circuit interrupting device according to claim 7, wherein said trip operation mechanically causes electrical discontinuity between said first and second conductors.

10. The circuit interrupting device according to claim 9, wherein said trip portion further comprises a trip arm that mechanically causes electrical discontinuity between said first and second conductors.

11. The circuit interrupting device according to claim 7, wherein said predetermined condition comprises a ground fault, an arc fault, an appliance leakage fault or an immersion fault.

12. The circuit interrupting device according to claim 6, wherein said reset lockout portion prevents reestablishment of electrical continuity between said first and second conductors if an open neutral condition exists.

13. A circuit interrupting device comprising:

a housing;

a pair of input conductors, one of said pair being a phase conductor and the other being a neutral conductor, said conductors being disposed within said housing and terminating through an exterior surface of said housing;

a pair of output conductors, one of said pair being a phase conductor and the other being a neutral conductor, said conductors being disposed within said housing and terminating through an exterior surface of said housing;

a circuit interrupter disposed within said housing and configured to break the continuity between said pair of input conductors and said pair of output conductors upon the occurrence of a predetermined condition;

a reset button disposed at least partially within said housing;

a reset mechanism configured to reestablish electrical continuity between said pair of input conductors and said pair of output conductors after said predetermined condition occurs, and configured to temporarily activate the circuit interrupter by simulating the occurrence of a predetermined condition when said reset button is depressed;

a reset lockout, responsive to the activation state of the circuit interrupter, for preventing the making of electrical continuity between said pair of input conductors and said pair of output conductors if a predetermined condition exists when said reset button is depressed; and a trip mechanism disposed at least partially within said housing and configured to break the electrical connection between said pair of input conductors and said pair of output conductors independently of said circuit interrupter operation.

14. The circuit interrupting device according to claim 13, wherein said predetermined condition comprises a ground fault, an arc fault, an appliance leakage fault, or an immersion fault.

15. The circuit interrupting device according to claim 13, wherein said trip mechanism comprises a trip actuator accessible from an exterior of said housing and a trip arm extending from said trip actuator, said trip arm being configured to facilitate mechanical breaking of electrical continuity between said pair of input conductors and said pair of output conductors upon actuation of said trip actuator.

16. The circuit interrupting device according to claim 15, wherein said trip actuator comprises a button.

17. The circuit interrupting device according to claim 15, wherein said reset lockout prevents the making of electrical continuity between said pair of input conductors and said pair of output conductors if an open neutral condition exists.

18. A circuit interrupting system with independent trip and reset lockout operations, comprising:
   a source of power;
   a circuit interrupting device connected to said source of power and having circuit interrupting, reset, reset lockout and independent trip portions, wherein the reset portion comprises a reset button and is configured to temporarily activate the circuit interrupting portion when said reset button is depressed by simulating the occurrence of a predetermined condition, and the reset lockout portion responds to an activation state of the circuit interrupting portion for performing the reset lockout operations; and
   at least one load connected to said circuit interrupting device.

19. The circuit interrupting system according to claim 18, wherein said circuit interrupting device comprises:
   a housing;
   a first electrical conductive path disposed at least partially within said housing and capable of being electrically connected to a source of power to receive electricity therefrom;
   a second electrical conductive path disposed at least partially within said housing and capable of conducting electrical current to a load when electrical continuity between said first and second electrical conductive paths is made;
   wherein the circuit interrupting portion is disposed within said housing and configured to break the continuity between said first and second conductive paths upon the occurrence of a predetermined condition;
   wherein a reset button is disposed at least partially within said housing;
   wherein the reset portion is configured to reestablish electrical continuity between the first and second conductive paths when said reset button is depressed;
   wherein the reset lockout portion prevents the making of electrical continuity between said first and second conductive paths if said circuit interrupting portion is non-operational; and
   wherein the trip portion is disposed at least partially within said housing and configured to break the continuity between said first and second conductive paths independently of said circuit interrupting portion operation.

20. The circuit interrupting device according to claim 19, wherein said trip portion comprises a trip actuator accessible from an exterior of said housing and a trip arm extending from said trip actuator, said trip arm being configured to facilitate mechanical breaking of electrical continuity between said first and second electrical conductive paths if said trip actuator is actuated.

21. The circuit interrupting device according to claim 20, wherein said trip actuator comprises a button.

22. The circuit interrupting device according to claim 19, wherein said circuit interrupting portion includes a circuit interrupter used to facilitate making and breaking of electrical continuity between said first and second electrical conductive paths, and sensing circuitry used to sense the occurrence of said predetermined condition.

23. The circuit interrupting device according to claim 19, wherein said predetermined condition comprises a ground fault, an arc fault, an appliance leakage fault or an immersion fault.

24. An electrically controlled system whose operation is dependent upon a source of electricity, comprising:
   a source of electricity;
   at least one load;
   a device housing;
   a first electrical conductive path disposed at least partially within said housing and capable of being electrically connected to said source of electricity;
   a second electrical conductive path disposed at least partially within said housing and capable of conducting electrical current to said at least one load when electrical continuity between said first and second electrical conductive paths is made;
   circuit interrupting means disposed within said housing for breaking the continuity between said first and second conductive paths upon the occurrence of a predetermined condition;
   a reset button disposed at least partially within said housing;
   reset means for reestablishing electrical continuity between the first and second conductive paths, and for activating the circuit interrupting means by simulating the occurrence of a predetermined condition when said reset button is depressed;
   reset lockout means, responsive to the activation state of the circuit interrupting means, for preventing the making of electrical continuity between said first and second conductive paths upon an occurrence of said circuit interrupting means being non-operational; and
   trip means disposed at least partially within said housing for breaking the continuity between said first and second conductive paths substantially independently of the operation of said circuit interrupting means.

* * * * *